(12) United States Patent
Kline et al.

(10) Patent No.: US 11,164,138 B2
(45) Date of Patent: Nov. 2, 2021

(54) MOBILE PACKAGE DELIVERY

(71) Applicant: International Business Machines Corporation, Armonk, NY (US)

(72) Inventors: Eric V. Kline, Rochester, MN (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 214 days.

(21) Appl. No.: 16/017,246

(22) Filed: Jun. 25, 2018

(65) Prior Publication Data
US 2019/0392371 A1  Dec. 26, 2019

(51) Int. Cl.
*G06Q 10/08* (2012.01)

(52) U.S. Cl.
CPC .................. *G06Q 10/083* (2013.01)

(58) Field of Classification Search
CPC ......... G06Q 10/083; G06Q 10/0831–10/0834; G06Q 10/08355; G06Q 10/08
See application file for complete search history.

(56) References Cited

U.S. PATENT DOCUMENTS

| | | | |
|---|---|---|---|
| 9,561,852 B1 * | 2/2017 | Beaman | .................. B64D 1/00 |
| 9,786,187 B1 | 10/2017 | Bar-Zeev et al. | |
| 2015/0323333 A1 | 11/2015 | Lord | |
| 2016/0328669 A1 * | 11/2016 | Droege | ............ G06Q 10/06311 |
| 2017/0024688 A1 | 1/2017 | Wiechers | |
| 2017/0124512 A1 | 5/2017 | Harvey | |
| 2017/0166356 A1 * | 6/2017 | Tubilia Kuri | .......... B25J 9/1679 |
| 2017/0178070 A1 * | 6/2017 | Wang | ................. G06Q 10/0832 |
| 2017/0185948 A1 | 6/2017 | Magazinik | |
| 2018/0024554 A1 * | 1/2018 | Brady | ....................... G06T 7/20 |
| | | | 701/23 |
| 2018/0025635 A1 | 1/2018 | Cheaz et al. | |

(Continued)

OTHER PUBLICATIONS

Variable-height load delivery, (product focus). (2003). Modern Materials Handling, 58(6), 50(2). Retrieved from https://dialog.proquest.com/professional/docview/1057569698?accountid=131444 (Year: 2003).*

(Continued)

*Primary Examiner* — Kevin H Flynn
*Assistant Examiner* — Michelle E Carey
(74) *Attorney, Agent, or Firm* — Cantor Colburn LLP; Tihon Poltavets (57) ABSTRACT

Embodiments include methods, systems and computer program products method for transferring one or more packages between delivery vehicles. The computer-implemented method includes monitoring, using a processor, a plurality of delivery vehicles. The processor determines that one or more packages should be transferred between a first delivery vehicle and a second delivery vehicle of the plurality of delivery vehicles. The processor further instructs the first delivery vehicle and the second delivery vehicle to meet at a rendezvous location. The processor identifies one or more packages to transfer from the first delivery vehicle to the second delivery vehicle. The processor further transfers the identified one or more packages from the first delivery vehicle to the second delivery vehicle. The processor further stores the identified one or more packages in the second delivery vehicle.

14 Claims, 7 Drawing Sheets

(56) References Cited

U.S. PATENT DOCUMENTS

2018/0205682 A1* 7/2018 O'Brien ............... G03H 1/0005
2018/0281657 A1* 10/2018 Healey ................ G05D 1/0293
2018/0330319 A1* 11/2018 Liang .................. G05D 1/0088

OTHER PUBLICATIONS

Gartenberg, Chris, "Wireless vehicle-to-vehicle communication would be required in new cars under proposed DOT rule," the Verge, URL: https://www.theverge.com/2016/12/13/13936342/wireless-vehicle-to-vehicle-communication-v2v-v2i-dot-nhtsa. Published Dec. 13, 2016. 2 pages.

Wankhede, Anish, "What is Ship-To-Ship Transfer (STS) and Requirements to Carry Out the Same?" Marine Insight, URL: http://www.marineinsight.com/maritime-law/what-is-ship-to-ship-transfer-sts-and-requirements-to-carry-out-the-same/. Published Oct. 13, 2019.

\* cited by examiner

MOBILE PACKAGE DELIVERY

BACKGROUND

The present invention relates in general to package deliveries and more specifically, to the transfer of packages between delivery vehicles to facilitate package delivery at a destination location.

Package delivery or parcel delivery relates to the delivery of shipping containers, parcels, or high value mail as single shipments. Package delivery services can be provided by a variety of companies or organizations, for example, government postal offices, private courier companies, and other shipping carriers.

SUMMARY

Embodiments of the invention are directed to a method for transferring one or more packages between delivery vehicles. A non-limiting example of the computer-implemented method includes monitoring, using a processor, a plurality of delivery vehicles. The processor determines that one or more packages should be transferred between a first delivery vehicle and a second delivery vehicle of the plurality of delivery vehicles. The processor further instructs the first delivery vehicle and the second delivery vehicle to meet at a rendezvous location. The processor identifies one or more packages to transfer from the first delivery vehicle to the second delivery vehicle. The processor further transfers the identified one or more packages from the first delivery vehicle to the second delivery vehicle. The processor further stores the identified one or more packages in the second delivery vehicle.

Embodiments of the invention are directed to a computer program product that can include a storage medium readable by a processing circuit that can store instructions for execution by the processing circuit for performing a method for transferring one or more packages between delivery vehicles. The method includes monitoring a plurality of delivery vehicles. The processor determines that one or more packages should be transferred between a first delivery vehicle and a second delivery vehicle of the plurality of delivery vehicles. The processor further instructs the first delivery vehicle and the second delivery vehicle to meet at a rendezvous location. The processor identifies one or more packages to transfer from the first delivery vehicle to the second delivery vehicle. The processor further transfers the identified one or more packages from the first delivery vehicle to the second delivery vehicle. The processor further stores the identified one or more packages in the second delivery vehicle.

Embodiments of the invention are directed to a system including a plurality of delivery vehicles. The system can include a processor in communication with one or more types of memory. The processor can be configured to monitor the plurality of delivery vehicles. The processor can be configured to determine that one or more packages should be transferred between a first delivery vehicle and a second delivery vehicle of the plurality of delivery vehicles. The processor can be configured to instruct the first delivery vehicle and the second delivery vehicle to meet at a rendezvous location. The processor can be configured to identify one or more packages to transfer from the first delivery vehicle to the second delivery vehicle. The processor can be configured to transfer the identified one or more packages from the first delivery vehicle to the second delivery vehicle. The processor can be configured to store the identified one or more packages in the second delivery vehicle.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The forgoing and other features, and advantages of the disclosure are apparent from the following detailed description taken in conjunction with the accompanying drawings in which.

The diagrams depicted herein are illustrative. There can be many variations to the diagram or the operations described therein without departing from the spirit of the invention. For instance, the actions can be performed in a differing order or actions can be added, deleted, or modified. In addition, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments of the invention, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, embodiments of the invention are related in general to package delivery and the coordination thereof. Often when a package delivery service has assigned delivery schedules to delivery vehicles additional packages residing at a warehouse/storage facility need to be delivered. Currently, a delivery vehicle already assigned to a delivery schedule often needs to return to the warehouse/storage facility to collect the additional packages. Having delivery vehicles return to the warehouse/storage facility is not efficient or cost effective manner to provide delivery services.

Turning now to an overview of the aspects of the invention, one or more embodiments of the invention address the above-described shortcomings of the prior art by causing additional packages that are needed to be delivered by a delivery vehicle to be transferred to the delivery vehicle by another delivery. Because the delivery vehicle is not required to return to the warehouse/storage facility to obtain the additional packages the delivery vehicle can continue with the assigned delivery schedule or be slightly delayed. Accordingly, package delivery can be more efficient and cost effective because delivery vehicles can remain at or near an area assigned to the delivery vehicle to deliver packages while still receiving additional packages for delivery.

The above-described aspects of the invention address the shortcomings of the prior art by coordinating package delivery transfers between delivery vehicles in order for the delivery vehicles to remain at or near a location or area associated with an assigned delivery schedule. Accordingly, vehicle package transfers between delivery vehicles can occur in an automated manner while the delivery vehicles are traveling along a road network.

It is understood in advance that although this disclosure includes a detailed description on cloud computing, implementation of the teachings recited herein are not limited to a cloud-computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider is computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems; storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud-computing environment is service oriented with a focus on statelessness, low coupling, modularity, and semantic interoperability. At the heart of cloud, computing is an infrastructure comprising a network of interconnected nodes.

Figure 1:
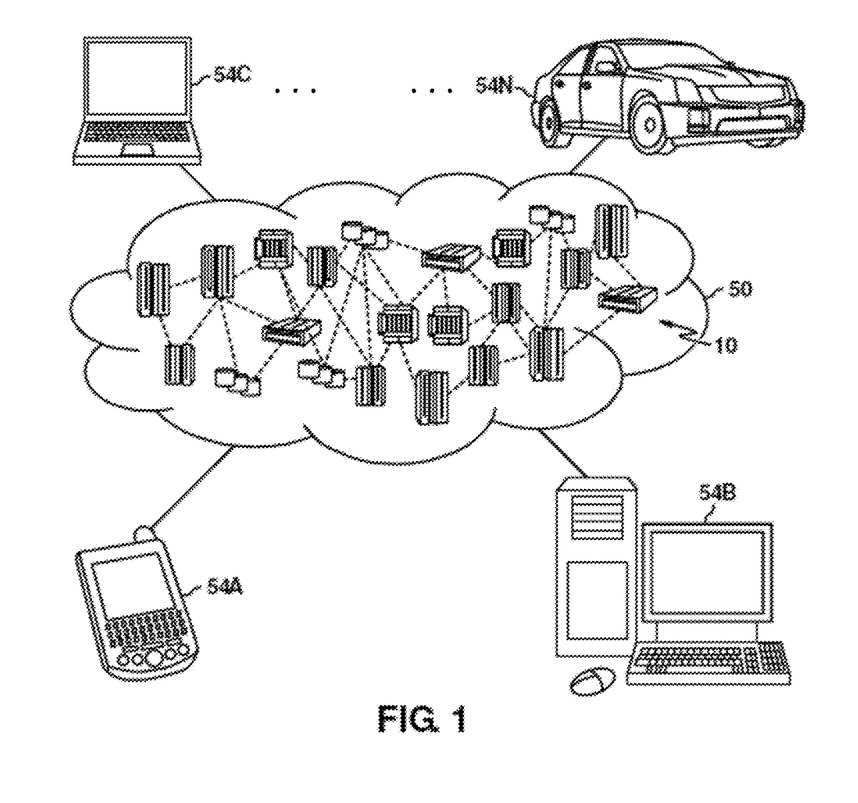
FIG. 1 depicts a cloud computing environment according to one or more embodiments of the present invention.

Referring now to FIG. 1, illustrative cloud computing environment 50 is depicted. As shown, cloud-computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud-computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
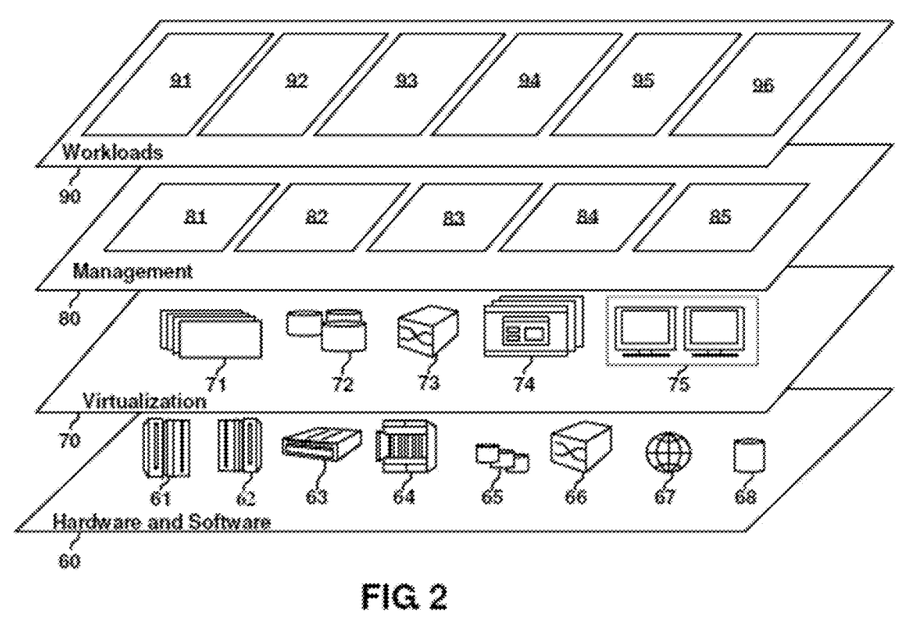
FIG. 2 depicts abstraction model layers according to one or more embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud-computing environment. Metering and Pricing 82 provide cost tracking as resources are utilized within the cloud-computing environment, and billing or invoicing for consumption of these resources. In one example, these resources may comprise application software licenses. Security provides identity verification for cloud consumers and tasks, as well as protection for data and other resources. User portal 83 provides access to the cloud-computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud-computing environment may be utilized. Examples of workloads and functions that may be provided from this layer include: mapping and navigation 91; software development and lifecycle management 92; virtual classroom education delivery 93; data analytics processing 94; transaction processing 95; and package delivery management 96.

Figure 3:
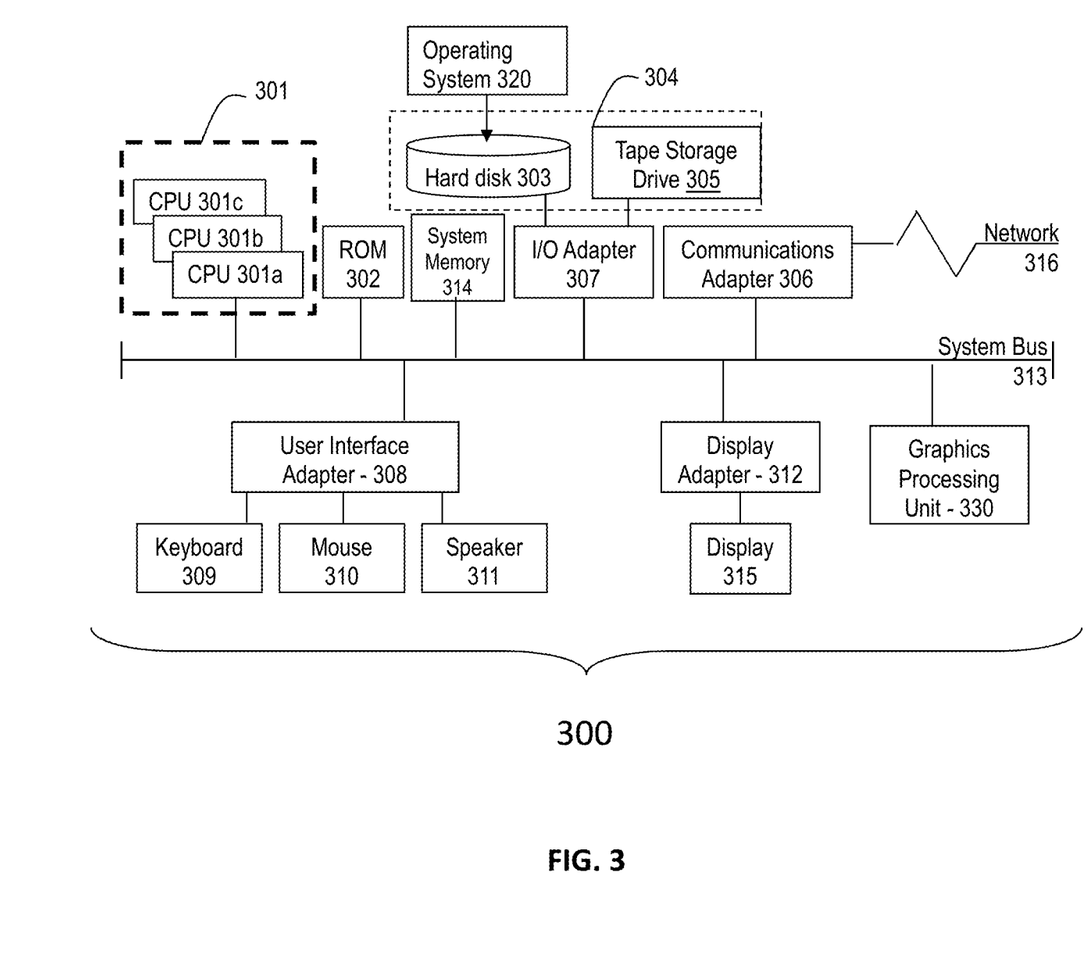
FIG. 3 is a block diagram illustrating one example of a processing system for practice of the teachings herein.

Referring to FIG. 3, there is shown a processing system 300 for implementing the teachings of the present disclosure according to one or more embodiments of the invention described herein. The system 300 has one or more central processing units (processors) 301a, 301b, 301c, etc. (collectively or generically referred to as processor(s) 301). In one embodiment, each processor 301 may include a reduced instruction set computer (RISC) microprocessor. Processors 301 are coupled to system memory 314 and various other components via a system bus 313. Read only memory (ROM) 302 is coupled to the system bus 313 and may include a basic input/output system (BIOS), which controls certain basic functions of system 300.

FIG. 3 further depicts an input/output (I/O) adapter 307 and a communications adapter 306 coupled to the system bus 313. I/O adapter 307 may be a small computer system interface (SCSI) adapter that communicates with a hard disk 303 and/or tape storage drive 305 or any other similar component. I/O adapter 307, hard disk 303, and tape storage device 305 are collectively referred to herein as mass storage 304. Operating system 320 for execution on the processing system 300 may be stored in mass storage 304. A communications adapter 306 interconnects bus 313 with an outside network 316 enabling data processing system 300 to communicate with other such systems. A screen (e.g., a display monitor) 315 is connected to system bus 313 by display adapter 312, which may include a graphics adapter to improve the performance of graphics intensive applications and a video controller. In one embodiment, adapters 307, 306, and 312 may be connected to one or more I/O busses that are connected to system bus 313 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 313 via user interface adapter 308 and display adapter 312. A keyboard 309, mouse 310, and speaker 311 all interconnect to bus 313 via user interface adapter 308, which may include, for example, a Super I/O chip integrating multiple device adapters into a single integrated circuit.

In exemplary embodiments of the invention, the processing system 300 includes a graphics-processing unit 330. Graphics processing unit 330 is a specialized electronic circuit designed to manipulate and alter memory to accelerate the creation of images in a frame buffer intended for output to a display. In general, graphics-processing unit 330 is very efficient at manipulating computer graphics and image processing, and has a highly parallel structure that makes it more effective than general-purpose CPUs for algorithms where processing of large blocks of data is done in parallel.

Thus, as configured in FIG. 3, the processing system 300 includes processing capability in the form of processors 301, storage capability including system memory 314 and mass storage 304, input means such as keyboard 309 and mouse 310, and output capability including speaker 311 and display 315. In one embodiment, a portion of system memory 314 and mass storage 304 collectively store an operating system such as the AIX® operating system from IBM Corporation to coordinate the functions of the various components shown in FIG. 3.

Figure 4:
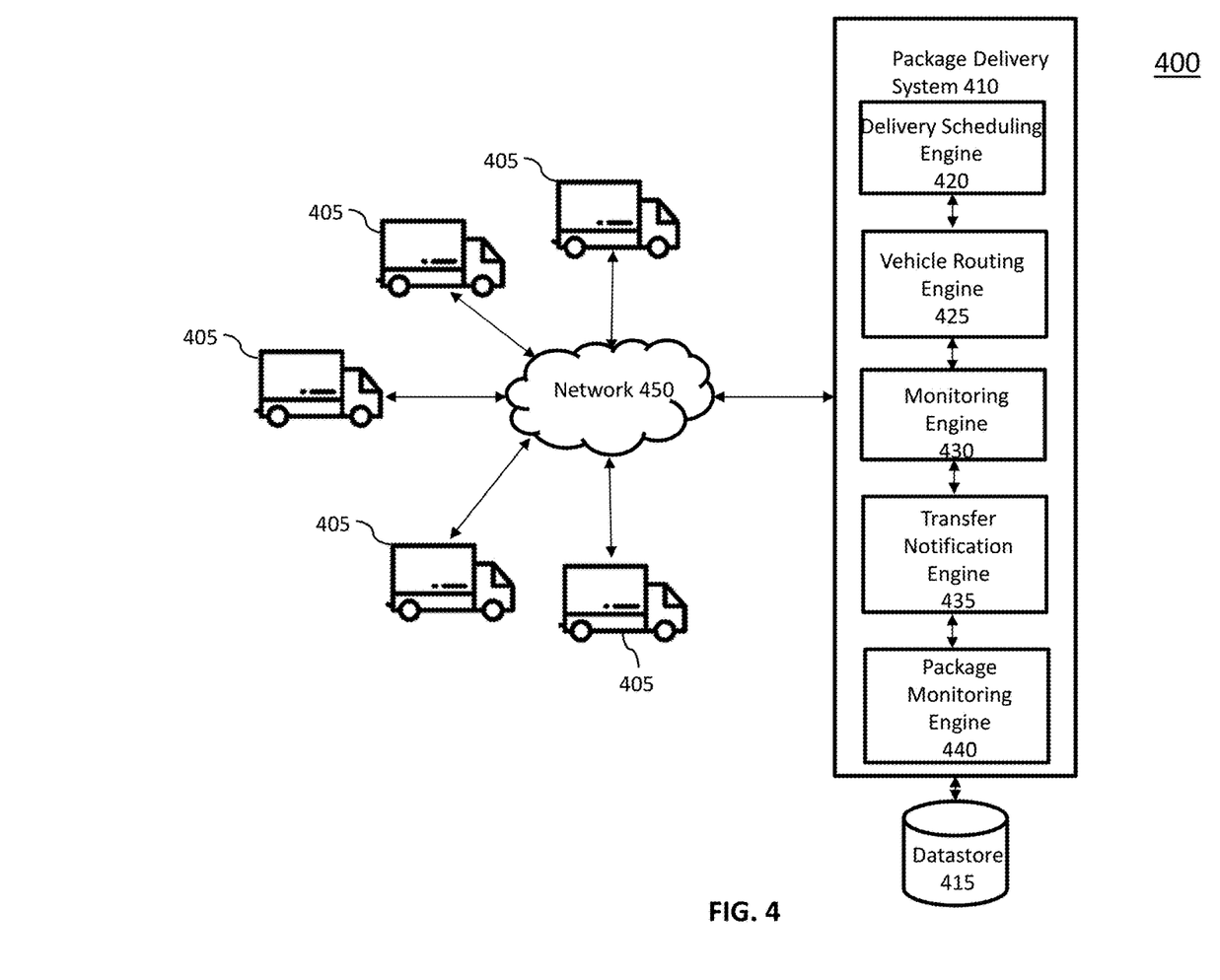
FIG. 4 illustrates a computing system according to one or more embodiments of the present invention.

Referring now to FIG. 4, there is illustrated a computing system 400 in accordance with one or more embodiments of the invention. As illustrated, the computing system 400 can include but is not limited to, a plurality of delivery vehicles 405, a package delivery system 410 and a datastore 415 connected over one or more networks, for example, network 450. The package delivery system 410 can include a delivery scheduling engine 420, a vehicle routing engine 425, a monitoring engine 430, a transfer notification engine 435 and a package monitoring engine 435. The package delivery system 410 can be stored on a server that is part of the cloud computing environment 50, for example, server.

In some embodiments of the invention, the plurality of delivery vehicles 405 can be any type of vehicle capable of transporting one or more packages. Each delivery vehicle 405 can operate as a driverless/autonomous, driver assisted or driver based vehicle.

Each delivery vehicle 405 can include one or more applications that can communicate with the package delivery system 410 over the one or more networks 450. Each delivery vehicle 405 can include a GPS transmitter/receiver (not shown) which is operable for receiving location signals from the plurality of GPS satellites that provide signals representative of a location for each of the plurality of delivery vehicles 405, respectively. In addition, each of the plurality of vehicles 405 includes a navigation processing system which is arranged to communicate with the package delivery system 410 through communications network 450. Accordingly, each of the plurality of delivery vehicles 405 is able to receive location/route information and transmit location/route information, as well as a package manifest and package location information to the package delivery system 410.

Each delivery vehicle 405 can be equipped with a conveyor mechanism or robotic arm (i.e., a transfer mechanism) in a front and/or rear portion of the delivery vehicle 405. Each delivery vehicle 405 can include removable or adjustable paneling or one or more electronically operable package delivery doors. Each delivery vehicle 405 can also include a failsafe mechanism (e.g., a tether, netting or the like) to prevent the loss of packages during package transfer. Each delivery vehicle 405 can also include a package manager which can locate, obtain packages, move packages into a delivery position, and move packages from a delivery position to a storage position. The package manager can be a robotic arm, conveyor or any other mechanism capable of identifying and moving packages within the delivery vehicle 405.

The network(s) 450 can include, but are not limited to, any one or a combination of different types of suitable communications networks such as, for example, cable networks, public networks (e.g., the Internet), private networks, wireless networks, cellular networks, or any other suitable private and/or public networks. Further, the network(s) 450 can have any suitable communication range associated therewith and can include, for example, global networks (e.g., the Internet), metropolitan area networks (MANs), wide area networks (WANs), local area networks (LANs), or personal area networks (PANs). In addition, the network(s) 450 can include any type of medium over which network traffic can be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof.

In some embodiments, the package delivery system 410 can operate on any type of computing device with network access, such as a computer, laptop, server, tablet, smartphone, wearable computing devices, or the like. The package delivery system 410 can be part of a cloud-computing environment (FIG. 1) that provides a specific functionality to the plurality of vehicles 405, such as a software-as-a-service functionality. The package delivery system 410 can facilitate package delivery of one or more packages, as well as the transfer of one or more packages between one or more of the plurality of vehicles 405.

The delivery scheduling engine 420 can include computer-readable instructions that, in response to execution by the processor(s) 301, cause operations to be performed including obtaining information related to the delivery of one or more packages to one or more destinations. The delivery scheduling engine 420 can determine which of a plurality of delivery vehicles 405 are available for delivery, for example, from a package warehouse/storage facility. The delivery scheduling engine 420 can create a schedule for the delivery of the one or more packages and assign a delivery manifest to each of the plurality of delivery vehicles 405 that are available for delivery. Accordingly, the scheduling engine 420 can coordinate the delivery of one or more packages by one or more delivery vehicles 405. The delivery manifest for each of the plurality of delivery vehicles 405 that are available for delivery can also be in consideration of one or more zones of responsibility assigned to a delivery vehicle 405.

The vehicle routing engine 425 may include computer-readable instructions that, in response to execution by the processor(s) 301, cause operations to be performed including creating a navigable delivery route for a delivery vehicle 405 based on the delivery vehicle's assigned delivery manifest. The navigable route created by vehicle routing engine 425 can be in consideration of the delivery of each package to a destination based on an associated delivery manifest. The vehicle routing engine 425 can also provide lane by lane guidance along the navigable delivery route.

The monitoring engine 430 may include computer-readable instructions that, in response to execution by the processor(s) 301, cause operations to be performed, including monitoring each delivery vehicle's 405 location while traveling along an associated navigable delivery route. The monitoring engine 430 can also monitor a location of delivery vehicles 405 that have not been assigned to a delivery route.

The transfer notification engine 435 may include computer-readable instructions that, in response to execution by the processor(s) 301, cause operations to be performed, including using location information received from the monitoring engine 430 and information related to the delivery of one or more packages to one or more destinations from the delivery scheduling engine 420 to coordinate additional package deliveries which would be more cost effective and/or efficiently performed without an assigned delivery vehicle 405 returning to the package warehouse/storage facility. The transfer notification engine 435 can create a list of packages that should be transferred from one delivery vehicle 405 to another delivery vehicle 405. Accordingly, transfer notification engine 435 can notify a delivery vehicle 405 that another delivery vehicle 405 has one or more packages that are to be transferred between the delivery vehicles 405.

The transfer notification engine 435 can instruct the delivery vehicles 405 coordinated for package transfer to rendezvous at a particular location along a road network or a stationary/parked location in order to conduct a package transfer. The delivery vehicles 405 coordinated for package transfer can communicate with each other to coordinate the package transfer. When at a rendezvous location, the coordinated delivery vehicles can communication with each other in order to adjust lanes to ensure that coordinated delivery vehicles 405 are located in the same lane and aligned with one another (i.e., a first delivery vehicle 405 is located in front of another delivery vehicle 405 without any intervening obstructions). The coordinated delivery vehicles 405 can also communicate with each other to adjust or be instructed to adjust speeds to a matching speed in which both vehicles traveling with zero relative velocity between the coordinated delivery vehicles 405. The transfer notification engine 435 can also instruct that the package transfer occurs at a boundary of a zone of responsibility assigned to one of the coordinated delivery vehicles 405. Once, lane coordination, speed, and alignment occurs between the coordinated delivery vehicle, the transfer notification engine 435 can instruct a delivery vehicle 405 of the coordinated delivery vehicles 405 to begin transferring one or more packages to the other delivery vehicle 405.

The package monitoring engine 440 may include computer-readable instructions that, in response to execution by the processor(s) 301, cause operations to be performed, including monitoring the transfer of one or more packages between coordinated delivery vehicles 405 and confirming a successful transfer of each package of the one or more packages intended to be transferred between coordinated delivery vehicles 405. For example, the package monitoring engine 440 can be notified by the package delivery system 410 of which packages are intended to be transferred between delivery vehicles 405, as well as, identity information associated with each package to be transferred. During package transfer, the package monitoring engine 440 can also monitor failsafe mechanisms for each package and provide notifications of package transfer issues during package transfer.

A package manager for a transferring delivery vehicle 405 of the coordinated vehicles 405 can obtain one or more packages from a storage position within the transferring delivery vehicle 405 and transfer the one or more packages using a transfer mechanism to a receiving delivery vehicle 405. The package manager can also confirm the transfer of each transferred package. A package manager for the receiving delivery vehicle 405 of the coordinated vehicles 405 can confirm receipt of each transferred package upon placement of each package in an associated a storage position for the receiving delivery vehicle 405.

The datastore 415 can store package identification information, zonal information, delivery vehicle location information, delivery schedule information, package destination information, package location information or the like. The datastore 415 can also store package transfer receipt confirmations for each transferred package.

Figure 5:
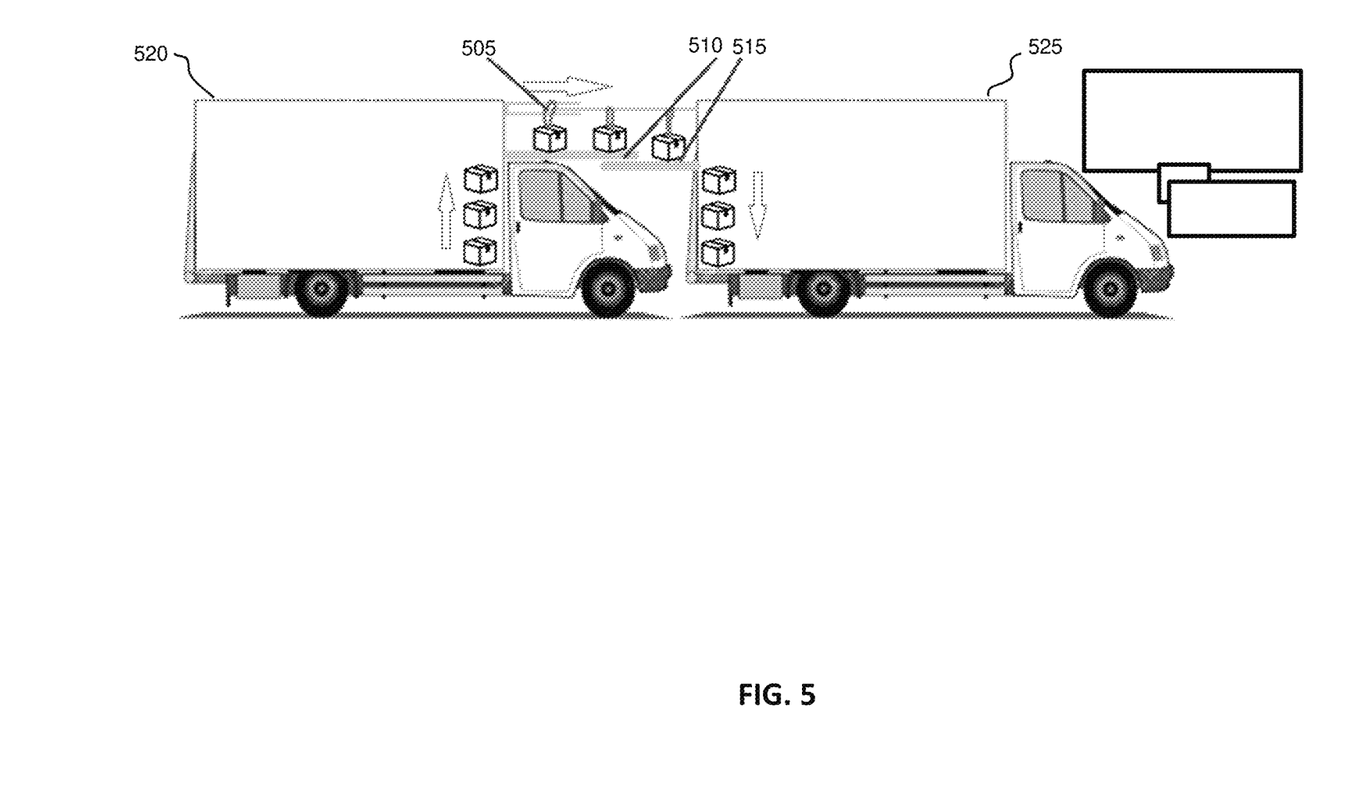
FIG. 5 illustrates an exemplary package transfer between package delivery vehicles according to one or more embodiments of the present invention.

FIG. 5 illustrates an exemplary package transfer between package delivery vehicles in accordance with one or more embodiments of the present invention. In FIG. 5, before or after lane coordination, speed and alignment have occurred for delivery vehicles 520 and 525, which have met at a rendezvous location determined by a package delivery engine, transferring delivery vehicle 520 can receive identification information related to packages intended to be transferred to receiving delivery vehicle 525. A package manager (not shown) for the transferring delivery vehicle 520 can obtain identification information associated with one or more packages designated to be transferred to the receiving delivery vehicle 525. The identification information for the one or more packages can be related to, for example, package identification numbers/bar codes/RFID codes and/or storage locations for each designated package within the transferring delivery vehicle 520. A transfer mechanism (not shown) can be used by the package manager to obtain the designated one or more packages, attach failsafe mechanisms 505 to each designated package and transfer each designated package along a transfer portion 510 associated with the transferring delivery vehicle 520. The package manager can confirm a transfer of each designated package along the transfer portion 510 associated with the transferring delivery vehicle 520. If a package designated to be transferred cannot be obtained or is not residing within the transferring delivery vehicle 520, the transferring delivery vehicle 520 can notify the package delivery system 410 and/or the receiving delivery vehicle 525.

A transfer portion 515 associated with the receiving delivery vehicle 525 can receive the designated one or more packages from the transfer portion 510 associated with the transferring delivery vehicle 520. A transfer mechanism (not shown) can be used by a package manager (not shown) for the receiving delivery vehicle 525 to obtain the designated one or more packages from the transfer portion 515, detach the failsafe mechanisms 505 associated with each designated package and transfer each designated package to a storage location within the receiving delivery vehicle 525. The package manager of the receiving delivery vehicle 525 can confirm receipt of each designated package the package delivery system 410 and/or transferring delivery vehicle 520. Accordingly, by transferring packages between delivery vehicles, the receiving delivery vehicle 525 can deliver additional packages without having to return to a package warehouse/storage facility.

Figure 6A:
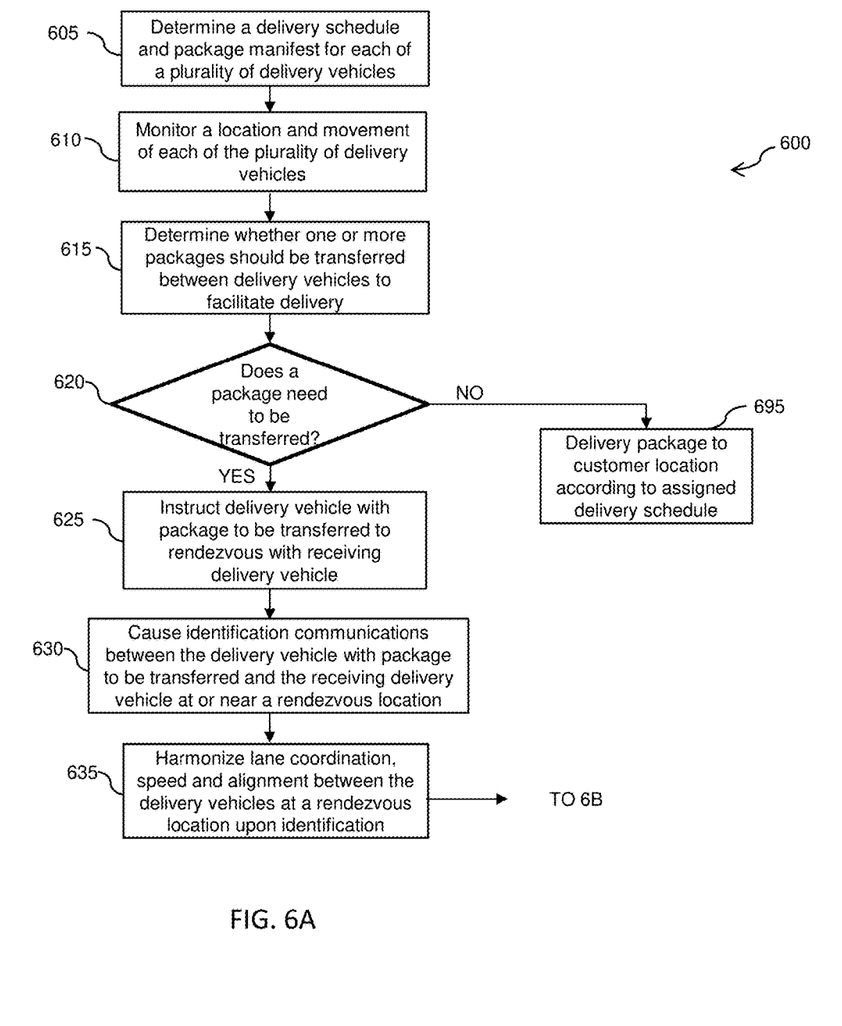
FIG. 6A is a flow diagram of a method for transferring one or more packages between delivery vehicles according to one or more embodiments of the present invention.

Now referring to FIG. 6, a flow diagram of a method 600 for transferring one or more packages between delivery vehicles in accordance with one or more embodiments of the present invention is illustrated. At block 605, a package system, for example, a package delivery system 410 can determine and assign a delivery schedule and package manifest for each of a plurality of delivery vehicles. At block 610, the package system can monitor a location and/or movement of each the plurality of delivery vehicles associated with the package system, including those vehicles which may not have been assigned a delivery schedule and package manifest. For example, each of the plurality of delivery vehicles can be assigned to a delivery zone and movements to/from and within a delivery zone can be monitored by the package system. At block 615, the package system can determine whether it is more cost effective and/or efficient for a package to be transferred from one delivery vehicle to another delivery vehicle instead of having the delivery vehicle return to a package warehouse/storage facility to obtain newly assigned packages.

At block 620, if packages do not need to be transferred from one delivery vehicle to another delivery vehicle, the method 600 proceeds to block 695 where the packages can be delivered to a customer location according to an assigned delivery schedule for the delivery vehicle. If packages should be transferred from one delivery vehicle to another delivery vehicle, the method 600 proceeds to block 625 where the package system can instruct a delivery vehicle who contains one or more packages to be transferred (transferring delivery vehicle) to rendezvous with a delivery vehicle designated to receive the one or more packages (receiving delivery vehicle). The transferring delivery vehicle can obtain the one or more packages from the package warehouse/storage facility or another delivery vehicle. If the package system has assigned individual delivery vehicles to designated delivery zones, a location associated with the rendezvous can be a location along a boundary of the designated delivery zone assigned to either delivery vehicle.

At block 630, the package system can cause the transferring delivery vehicle to communicate with the receiving delivery vehicle to perform identity verification between the delivery vehicles at or near the instructed rendezvous location. The identity verification can be used to ensure that the transfer of packages between the correct delivery vehicles occurs.

At block 635, the transferring delivery vehicle and the receiving delivery vehicle can coordinate with each other to conduct lane coordination, speed coordination, and alignment coordination once identification at the rendezvous location (harmonization) occurs. At block 640, before or during harmonization, the package system can communicate with the transferring delivery vehicle to identify the one or more packages intended to be transferred to the transferring delivery vehicle.

At block 645, a package manager for the transferring delivery vehicle can conduct a transfer process to obtain the identified one or more packages intended to be transferred from assigned storage locations within the transferring delivery vehicle using a transfer mechanism. The package manager can instruct the transfer mechanism within the transferring delivery vehicle to move the identified one or more packages to a front or rear portion of the transferring delivery vehicle. At block 650, the package manager of the transferring delivery vehicle and the package manager of the receiving delivery vehicle can coordinate transferring the one or more packages via associated transfer mechanisms. The transfer mechanisms for each delivery vehicle can extend at least a portion of a distance between the delivery vehicles to overlap each other or have the ability to contact one or more packages at the same time.

Figure 6B:
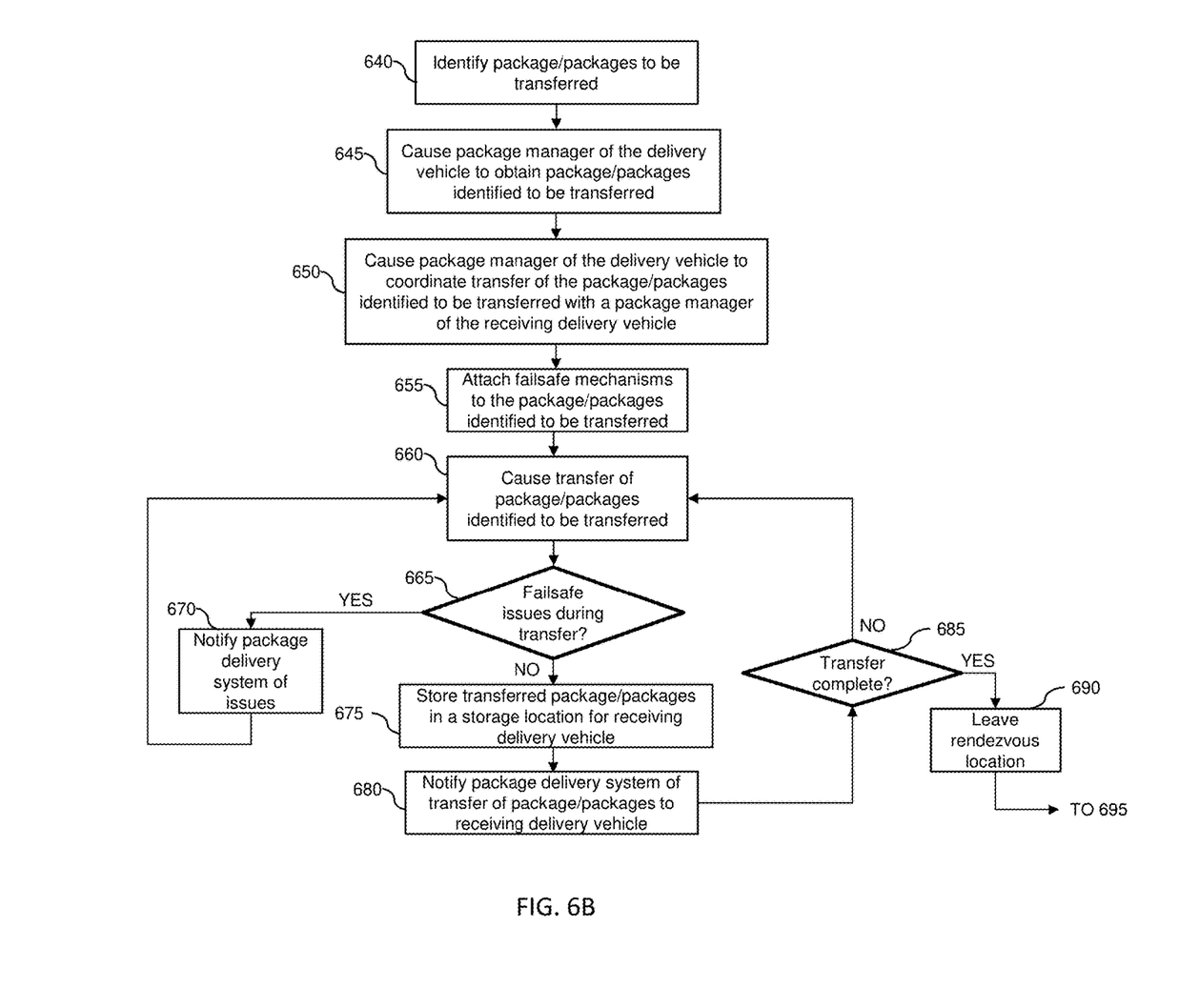
FIG. 6B is a flow diagram of a method for transferring one or more packages between delivery vehicles according to one or more embodiments of the present invention.

At block 655, the transfer mechanism for the transferring delivering vehicle can attach a failsafe mechanism to each of the one or more packages intended to be transferred. The failsafe mechanism can be used to prevent the loss of the one or more packages during an associated transfer between the delivery vehicles. At block 660, the transfer mechanism for the transferring delivering vehicle can transfer the one or more packages to the transfer mechanism for the receiving delivering vehicle.

At block 665, a determination of whether any failsafe mechanisms have failed during package transfer. If a failsafe mechanism for a package has failed, at block 670, the package system can receive a notification of a failsafe being triggered as a result of a package being lost during transfer between delivery vehicles. The notification can include package identification information. The method 600 can subsequently return to block 660.

If a failsafe mechanism for a package being transferred has not failed, the method 600 proceeds to block 675 where the transfer mechanism for the receiving delivery vehicle can store the transferred one or more packages in an assigned storage location within the receiving delivery vehicle. At block 680, the package manager of the receiving delivery vehicle can notify the package system that each transferred package has successfully been stored in an assigned storage location within the receiving delivery vehicle.

At block 685, the delivery vehicles can determine if the transfer of all packages intended to be transferred is complete. If the transfer of packages is not complete, the method 600 returns to block 660. If the transfer of packages is complete, the method 600 proceeds to block 690 where the package system can instruct the delivery vehicles to leave the rendezvous location and return to the assigned delivery schedule associated with each delivery vehicle. At block 695, the receiving delivery vehicle can deliver the transferred package to a customer location according to an assigned delivery schedule for the receiving delivery vehicle, and the transferring delivery vehicle can deliver packages remaining to customer locations according to an assigned delivery schedule for the transferring delivery vehicle.

Accordingly, a system, a method, and/or computer program product disclosed herein can transfer packages between vehicles in an automated manner when the vehicles are running on the road. The system can adjust the speed of delivery vehicles transferring packages between each other and direct lane changes. The delivery vehicles can dynamically align with each other in such a way that a collapsible conveyor system installed in each vehicle can create a seamless conveyor based transfer path, which can be used move packages from a source delivery vehicle to a target delivery vehicle.

The system can analyze data sent from each delivery vehicle to identify a target delivery vehicle in which a package can be transferred in order to deliver the package to an associated customer location. The system can use the following information during the associated analysis: a route of each delivery vehicle, a customer location associated with each package to the delivered, a threshold duration for a pair of delivery vehicles while at a rendezvous location to transfer packages, delivery vehicle space assessments to determine available space in the delivery vehicle to receive additional package.

The system also recognizes that a plurality of packages are stored in a transferring delivery vehicle, and only a subset of the plurality of packages are to be transferred to receiving delivery vehicle, the transferring delivery vehicle can include a means for selecting and captivating specific packages. The selection means could include a robot or conveyor system and also can identify packages. The captivation means could include a robot or conveyor system and can read/validate a package's identity. The transfer means could include robot or conveyor which can conduct package read/validation and may include a cooperative transfer (e.g., robot-to-robot, etc.).

Since there may be another transfer of the previously transferred package from the receiving delivery vehicle to another receiving delivery vehicle, packages transferred from the transferring delivery vehicle to the receiving delivery vehicle can be arranged/stored at a location within the original receiving delivery vehicle with a potential subsequent transfer in mind. Packages designated for a subsequent transfer to another receiving delivery vehicle can be arranged according to when the original receiving delivery vehicle is scheduled to rendezvous with another receiving delivery vehicle.

As an alternative, delivery vehicles can contain an inventory of frequently bought commodities. In this case, the system can employ large and small delivery vehicles in which the large delivery vehicles could operate as moving inventory hubs (MIHs) where the MIHs could contain a different mix of commodity inventories based on an associated patrol areas/boundaries and the smaller delivery vehicles can receive additional items from the larger delivery vehicles in order to deliver the items to customers. The MIH could also rendezvous with non-delivery vehicles containing customers requesting items.

Each delivery vehicle can have at least two collapsible conveyor mechanisms installed. For example, one conveyor mechanism can be installed towards the rear of the delivery vehicle and another conveyor mechanism can be installed towards the front of the delivery vehicle.

A delivery system can identify the packages which are to be transferred to another vehicle. Each delivery vehicle can share route information and package destination information to other delivery vehicles using a remote/cloud server. Delivery vehicles instructed to transfer packages between each other can use identifying information associated with each delivery vehicle and information related to delivery vehicle movement direction and package destination information.

The delivery system can analyze the timing, delivery vehicle routes, and package movement to identify the appropriate vehicles to notify for package transfer. Each delivery vehicle of the identified pair of delivery vehicles for package transfer can control an associated speed in such a way that the pair of delivery vehicles can create a proximate distance between each other in order to initiate package transfer.

While transferring packages from one delivery vehicle to another delivery vehicles, the participating delivery vehicles can adjust their speeds in such a way that, the pair of vehicles are within very close proximity, and accordingly an associated collapsible conveyor system for each delivery vehicle can expand to facilitate the transfer of the packages.

Each package can be identified uniquely and loaded into a delivery vehicle in such a way that, a relative position of each package can be identified at any point of time. Packages that are to be transferred to another delivery vehicle can be placed in a dedicated location within the respective delivery vehicle. The respective delivery vehicle can include a conveyor system and elevator to transfer packages from one delivery vehicle to another.

The present invention may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for transferring one or more packages between delivery vehicles, the method comprising:
    receiving, by a processor, instructions to deliver one or more packages to a customer location;
    detecting, automatically by the processor, respective locations of a plurality of delivery vehicles using a Global Positioning System (GPS) device of each of the respective delivery vehicles, wherein the plurality of delivery vehicles comprises a first delivery vehicle and a second delivery vehicle;
    scheduling, by the processor, the first delivery vehicle to deliver the one or more packages to the customer location, wherein the scheduling comprises updating a delivery manifest of the first delivery vehicle to include the delivery of the one or more packages, and creating a navigable route for the first delivery vehicle to the customer location;
    determining one or more packages for transfer from the first delivery vehicle to the second delivery vehicle;
    instructing, by the processor, the first delivery vehicle and the second delivery vehicle to meet at a rendezvous location, the first delivery vehicle comprising a first conveyor system, and the second delivery vehicle comprising a second conveyor system;
    identifying, by the processor, the one or more packages in the first delivery vehicle to transfer to the second delivery vehicle;
    transferring, by the first conveyor system, the identified one or more packages from the first delivery vehicle to the second conveyor system of the second delivery vehicle, wherein transferring by the first conveyor system the identified one or more packages from the first delivery vehicle to the second conveyor system of the second delivery vehicle comprises attaching a failsafe mechanism to each package of the one or more packages, wherein the failsafe mechanism comprises a tether;
    and storing, by the second conveyor system, the identified one or more packages in the second delivery vehicle.

2. The computer-implemented method of claim 1, wherein the transfer of the identified one or more packages occurs while the first delivery vehicle and the second delivery vehicle are in motion.

3. The computer-implemented method of claim 1, further comprising assigning a delivery schedule and a second package manifest to the second delivery vehicle.

4. The computer-implemented method of claim 1, further comprising facilitating communications between the first delivery vehicle and the second delivery vehicle.

5. The computer-implemented method of claim 4, wherein the communications is used to coordinate to at least one of:
    speed, lane travel and alignment.

6. A computer program product, the computer program product comprising a computer readable storage medium having program instructions embodied therewith, the program instructions readable by a processing circuit to cause the processing circuit to:
    receive instructions to deliver one or more packages to a customer location;
    detect, automatically, respective locations of a plurality of delivery vehicles using a Global Positioning System (GPS) device of each of the respective delivery vehicles, wherein the plurality of delivery vehicles comprises a first delivery vehicle and a second delivery vehicle;

schedule the first delivery vehicle from the plurality of delivery vehicles to deliver the one or more packages to the customer location, wherein the scheduling comprises updating a delivery manifest of the first delivery vehicle to include the delivery of the one or more packages, and creating a navigable route for the first delivery vehicle to the customer location;

determine one or more packages for transfer from the first delivery vehicle to the second delivery vehicle;

instruct the first delivery vehicle and the second delivery vehicle to meet at a rendezvous location, the first delivery vehicle comprising a first conveyor system, and the second delivery vehicle comprising a second conveyor system;

identify the one or more packages in the first delivery vehicle to transfer to the second delivery vehicle;

instruct the first conveyor system to transfer the identified one or more packages from the first delivery vehicle to the second conveyor system of the second delivery vehicle, wherein transferring by the first conveyor system the identified one or more packages from the first delivery vehicle to the second conveyor system of the second delivery vehicle comprises attaching a failsafe mechanism to each package of the one or more packages, wherein the failsafe mechanism comprises a tether;

and instruct the second conveyor system to store the identified one or more packages in the second delivery vehicle.

7. The computer program product of claim 6, wherein the transfer of the identified one or more packages occurs while the first delivery vehicle and the second delivery vehicle are in motion.

8. The computer program product of claim 6, further comprising assigning a delivery schedule and a second package manifest to the second delivery vehicle.

9. The computer program product of claim 6, further comprising facilitating communications between the first delivery vehicle and the second delivery vehicle.

10. The computer program product of claim 9, wherein the communications is used to coordinate to at least one of: speed, lane travel and alignment.

11. A computer system, comprising:
a plurality of delivery vehicles;
a processor in communication with one or more types of memory, the processor configured to:

receive instructions to deliver one or more packages to a customer location;

detect respective locations of the plurality of delivery vehicles using a Global Positioning System (GPS) device of each of the respective delivery vehicles, wherein the plurality of delivery vehicles comprises a first delivery vehicle and a second delivery vehicle;

schedule the first delivery vehicle from the plurality of delivery vehicles to deliver the one or more packages to the customer location, wherein the scheduling comprises updating a delivery manifest of the first delivery vehicle to include the delivery of the one or more packages, and creating a navigable route for the first delivery vehicle to the customer location;

determine one or more packages for transfer from the first delivery vehicle to the second delivery vehicle;

instruct the first delivery vehicle and the second delivery vehicle to meet at a rendezvous location, the first delivery vehicle comprising a first conveyor system, and the second delivery vehicle comprising a second conveyor system;

identify the one or more packages in the first delivery vehicle to transfer to the second delivery vehicle;

instruct the first conveyor system to transfer the identified one or more packages from the first delivery vehicle to a second conveyor system of the second delivery vehicle, wherein transferring by the first conveyor system the identified one or more packages from the first delivery vehicle to the second conveyor system of the second delivery vehicle comprises attaching a failsafe mechanism to each package of the one or more packages, wherein the failsafe mechanism comprises a tether;

and instruct the second conveyor system to store the identified one or more packages in the second delivery vehicle.

12. The computer system of claim 11, wherein the transfer of the identified one or more packages occurs while the first delivery vehicle and the second delivery vehicle are in motion.

13. The computer system of claim 11, wherein the processor is further operable to assign a delivery schedule and a second package manifest to the second delivery vehicle.

14. The computer system of claim 11, wherein the processor is further operable to facilitate communications between the first delivery vehicle and the second delivery vehicle.

* * * * *